United States Patent
Cantz

[11] 3,810,298
[45] May 14, 1974

[54] METHOD OF MANUFACTURING TIRE STUD

[75] Inventor: Rolf J. Cantz, Berlin, Germany

[73] Assignee: Kennametal Inc., Latrobe, Pa.

[22] Filed: Nov. 21, 1972

[21] Appl. No.: 308,400

Related U.S. Application Data

[62] Division of Ser. No. 85,097, Oct. 29, 1970, Pat. No. 3,757,841.

[52] U.S. Cl. ............................................. 29/525
[51] Int. Cl. ........................................... B23p 19/02
[58] Field of Search ..................... 29/525; 152/210

[56] References Cited
UNITED STATES PATENTS

| | | |
|---|---|---|
| 3,230,997 | 1/1966 | Carlstedt .......................... 152/210 |
| 3,400,447 | 9/1968 | Woods et al ...................... 29/525 X |
| 3,477,490 | 11/1969 | Carlstedt .......................... 152/210 |
| 3,593,771 | 7/1971 | Carlstedt .......................... 152/210 |

FOREIGN PATENTS OR APPLICATIONS

| | | | |
|---|---|---|---|
| 1,903,668 | 8/1970 | Germany ............................ | 152/210 |

Primary Examiner—Charlie T. Moon
Attorney, Agent, or Firm—Melvin A. Crosby

[57] ABSTRACT

A tire stud having a body with a hard wear resistant pin mounted an axial bore in the body thereof and protruding from one end of the body. The body has a head on the other end and is mounted in the tread of a tire head end foremost with the end of the stud from which the pin protrudes about at the level of the surface of the tire tread or projecting slightly therefrom. The stud according to the present invention is particularly characterized in that the pin moves axially into the stud body as the stud wears thereby controlling the amount of the pin of the stud which protrudes from the end of the stud body.

9 Claims, 16 Drawing Figures

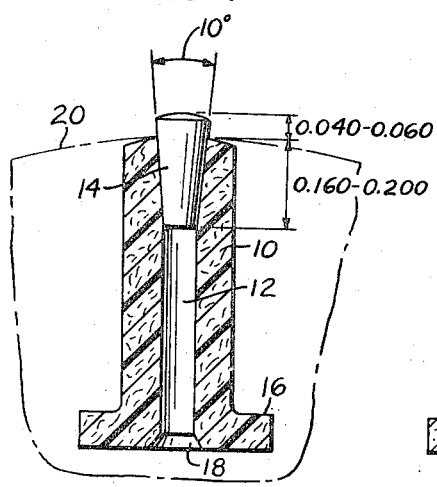
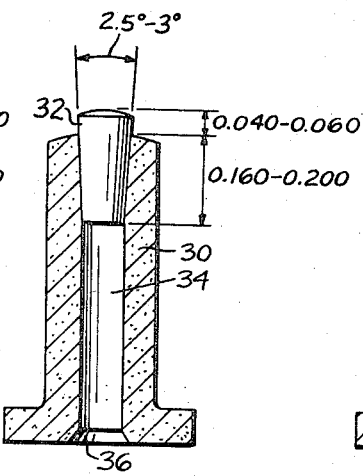
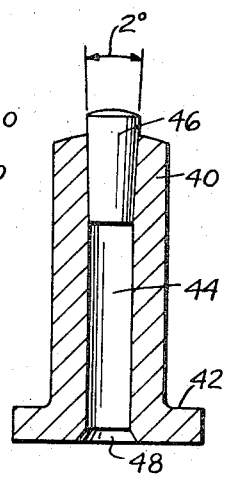
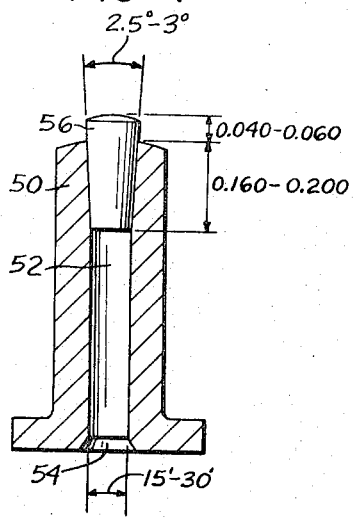
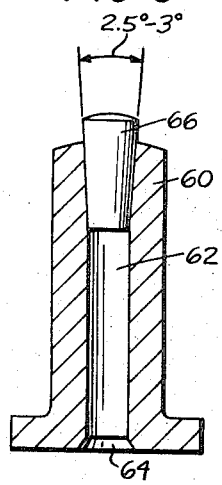
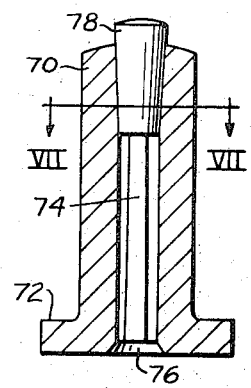
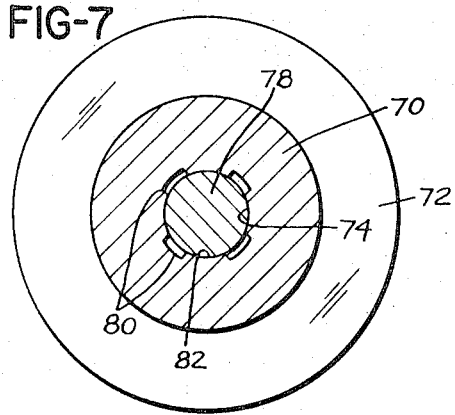
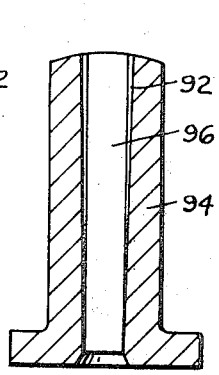
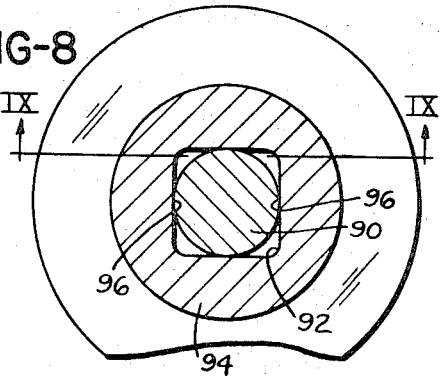

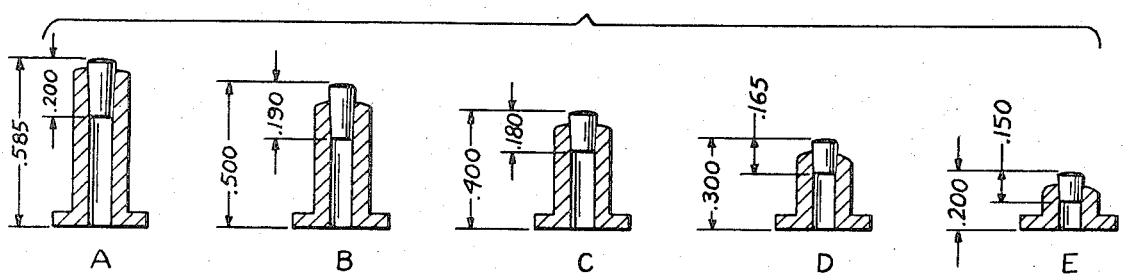
FIG-10
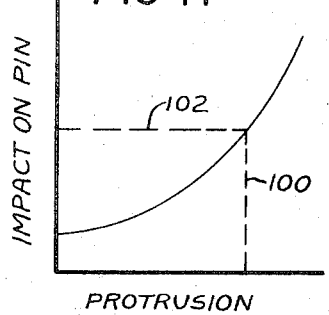
FIG-11
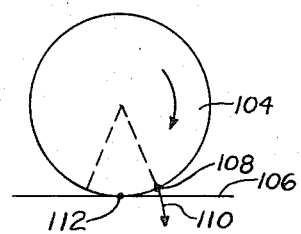
FIG-12
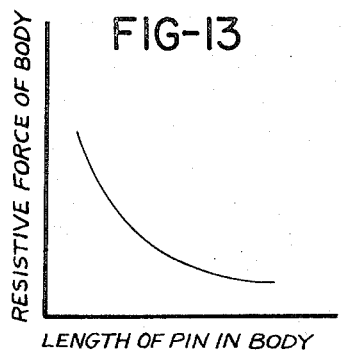
FIG-13
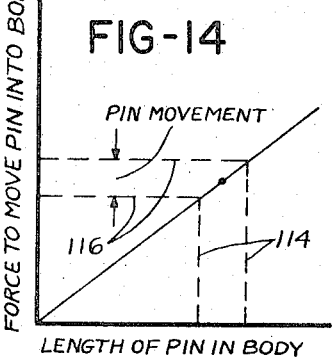
FIG-14
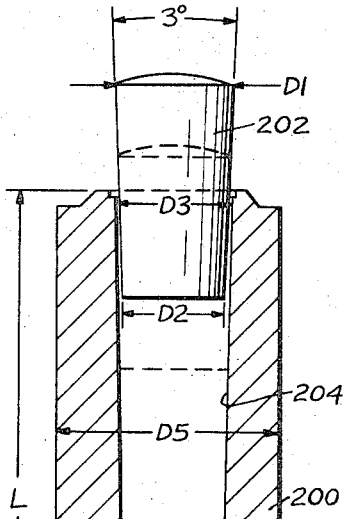
FIG-15
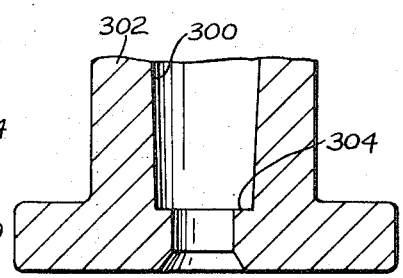
FIG-16
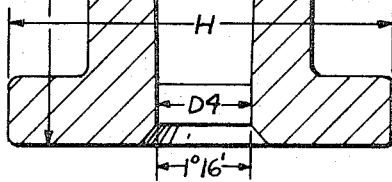

METHOD OF MANUFACTURING TIRE STUD

RELATED APPLICATION:

United States Ser. No. 85,097, filed Oct. 29, 1970, now U.S. Pat. No. 3,757,841, Entitled "TIRE STUD," Inventor - Rolf J. Cantz.

The present invention relates to tire studs and is particularly concerned with tire studs in which the protrusion of the hard pin from the outer end of the tire stud body is controlled so as to remain substantially constant throughout the life of the tire.

The present application is a division of my copending application Ser. No. 85,097, filed Oct. 29, 1970, now U.S. Pat. No. 3,757,841, and entitled "Tire Stud."

Tire studs are well known and the most popular type currently used comprises a stud body in the form of a cylinder having a single head on one end and having a hard wear resistant pin mounted on the axis of the stud body and protruding a short distance therefrom at the end opposite the head. The studs vary in size and the hard wear resistant pin is usually on the order of about half the length of the stud or a little more.

Studs of the nature referred to above are inserted, head end foremost, in blind holes provided therefor in tire treads so that the pin end of the stud projects a short distance outwardly from the surface of the tire tread whereby the end of the stud will engage the surface on which the tire rolls. Such studs are employed for increasing the traction of tires on slippery surfaces such as snow and ice and are highly effective for this purpose.

Certain problems present themselves in connection with use of tire studs in tire treads, however, that can, on occasion, become extremely troublesome. The bodies of the studs are generally made of metal, either solid metal or sintered from a metal powder, or from a relatively strong plastic, preferably reinforced, as by glass fibers. The pins in the studs, in order to be sufficiently wear resistant, are formed of a cemented metal carbide such as a tungsten carbide or a titanium carbide composition or a mixture of various hard carbides.

Heretofore, the hard pins have been compounded to have about the same wear rate as the rubber-like material of the tire tread in which they were mounted so as to maintain substantially the same protrusion of the pin end of the stud from the tire tread throughout the life of the tire and stud.

The compounding of the material of the pin to match the wear rate of the tread material of the tire has always been difficult and it is always possible for the stud to be installed in a tire having tread material different from that for which the stud was designed. This is particularly the case because substantially all studs are installed in retail outlets at the point of purchase of the tire in which they are mounted and by tire recappers and the like.

When the wear rate of a tire stud pin does not match the wear rate of the tread material of the tire, either the pin wears off too rapidly and the protrusion of the stud is lost and the stud becomes less effective, or the tire tread material wears more rapidly than the pin and the protrusion of the stud increases thereby leading to disadvantageous conditions.

More specifically, the disadvantageous conditions referred to are that, with too great a protrusion of the stud from the tread, the stud will be deflected as the tire rolls on a roadway thus tending to loosen the stud in the tire tread and also causing slipping of the pin on the roadway thereby developing heat in the stud and also causing road wear.

Furthermore, when a stud protrudes excessively from a tire tread, the traction of the tire on a clean dry road surface is reduced over what it would be if the studs had the correct amount of protrusion and remained upright in the tire tread. Further, the studs make more noise in operation when protruding an excessive amount from the tire tread.

Still further, when the protrusion of the stud from the tire increases to the point that the stud tends to deflect when the tire hits the roadway, the stud can have appreciably less gripping power on the surface which it engages than if the stud were upright in the tire and, therefore, presented endwise to the surface.

With the foregoing in mind, a primary objective of the present invention is a construction for a tire stud of the nature referred to in which the proper amount of protrusion of the pin from the outer end of the stud body is maintained throughout the life of the stud.

Another object of the present invention is the provision of a tire stud of the nature referred to which reduces road wear caused by the stud.

A still further object is the provision of a tire stud of the nature referred to which runs cooler in operation than heretofore known studs.

A still further object of the invention is the provision of a tire stud of the nature referred to which runs more quietly in operation.

It is also an object of the present invention to provide a tire stud of the nature referred to which permits a greater latitude in the selection of the carbide used for the pin in the stud and which permits the use of a smaller amount of carbide.

These and object objects and advantages of the present invention will become more apparent upon reference to the following detailed specification taken in connection with the accompanying drawings in which:

FIGS. 1 through 6 are vertical sectional views through different stud arrangements according to the present invention;

FIG. 7 is a plan sectional view indicated by line VII—VII on FIG. 6;

FIG. 8 is a view like FIG. 7 showing a modified arrangement;

FIG. 9 is a vertical sectional view indicated by line IX—IX on FIG. 8;

FIG. 10 is a composite view showing a stud according to the present invention at various stages during the life thereof;

FIG. 11 is a graph showing how the road impact on the tire stud pin varies with the protrusion of the pin from the tire tread;

FIG. 12 is a schematic view showing that the stud is impacted substantially in the axial direction as the tire rolls on a roadway;

FIG. 13 is a graph showing the characteristics of a modification of the invention wherein the force required to press a pin axially into the body varies if the pin migrates into the body;

FIG. 14 is a graph showing the range in which pin movement into the body occurs at different road impacts;

FIG. 15 is a vertical sectional view showing the details and dimensions of a typical stud according to the present invention; and FIG. 16 is a fragmentary view showing a modified form which the stud body can take.

BRIEF SUMMARY OF THE INVENTION:

The present invention is concerned with a tire stud arrangement in which a hard wear resistant pin is mounted in a body which is, in turn, mounted in a tire tread with the pin projecting from the tire tread surface. The particular feature disclosed in the present application is that of the pin moving axially into the stud body as the tire tread and stud body gradually wear down in use. The pin may wear down simultaneously with the tire tread and stud body but at a reduced rate, or the pin may be made of sufficient hardness that the wear thereon is diminished substantially at zero.

DETAILED DESCRIPTION OF THE INVENTION:

Referring to the drawings somewhat more in detail, in FIG. 1, the stud illustrated comprises a body 10 having a central through bore 12 with a hard wear resistant pin 14 mounted in bore 12 at one end. Body 10 at the end opposite the end in which the pin 14 is mounted comprises a single radial flange 16 forming the head of the stud.

The bore 12 at the head end thereof may be provided with a flared portion 18 of selected diameter and degree of taper and which is of importance in that it provides space into which the material of a tire tread can be displaced when the stud is pressed radially inwardly in the tire tread as the tire in which the stud is mounted rolls on a roadway.

As is known, the studs are inserted head end foremost into blind holes provided in the tire tread, the holes being substantially smaller in diameter than the stud body and the studs being inserted into the holes with the stud heads resting on the bottoms of the holes and with at least the outer end of the pin portion of the stud projecting outwardly from the tread surface. In FIG. 1, the surface of a tire tread in which the stud is mounted is indicated by the line 20.

It is of importance for the outer end of pin 14 to maintain about the same protrusion from the tread surface throughout the life of the tire and stud. The tread material of the tire has a certain wear rate and the material of the body of the stud is selected so that the wear rate thereof is at least as great as that of the tread material. The relationship between the outer end of the stud body and the surface of the tread of the tire thus remains substantially constant throughout the life of the tire and stud.

The pin 14, however, is formed of hard cemented carbide material such as cemented tungsten carbide or cemented titanium carbide, or a mixture of carbides, and is extremely hard. The pin can be compounded by selecting the type of binder metal, usually cobalt, or nickel, or a mixture thereof, and the percentage of the binder metal that is admixed with the carbides is selected to provide for a wear rate substantially matching that of the tire tread. The difficulty of matching the studs to the tire tread material in practice, however, prevents such selection of the wear rate of the carbide pin from being effective.

The studs are usually put into the tires at retail outlets, or by retreaders and the wear rates of the tire tread materials vary widely and the matching of the stud pins with the tread material is thus very difficult to accomplish in practice.

When the wear rate of the pin is not matched with the wear rate of the tread material, the pins either wear off too rapidly, thereby permitting the studs to become ineffective, or the pins wear off too slowly thereby leading to excessive protrusion of the pins from the tire tread. Excess protrusion leads to noisy operation of the studs, insufficient gripping power of the studs on the road surfaces because tilting of the studs in the tire tread, the generation of excessive heat in the studs due to slipping of the pins on the road surface as the studs deflect, and loosening of the studs in the tread material due to deflection of the studs as they strike the roadway and due to the deterioration of the tread material because of the heat developed in the studs.

The studs according to the present invention avoids a condition of excessive protrusion of the pin from the tire tread, even where the wear rate of the pin is less than that of the tire tread, by permitting the pin to move axially into the stud body in a controlled manner as the tire tread and stud body wear away.

By this expedient, the necessity of close matching of the rate of wear of the stud pin to that of the tread material is eliminated and the studs will remain more effective in use and road wear will be reduced while, furthermore, less material is required for the pins and the material of the pins can be almost entirely used up thereby representing a substantial economy.

In the modification of FIG. 1, the stud body 10 is formed of a reinforced plastic material, for example, a plastic material reinforced by glass fibers or the like. Plastic material such as Delrin or a polycarbonate or other known plastic materials resistant to elevated temperatures and sufficiently tough to withstand the impacting of the studs on a road surface can be employed.

With such a stud body, the pin 14 is formed to a taper with an included angle between the opposite sides thereof of about 10°. Tapered pins are known in connection with tire studs and permit assembling of the pins in the stud bodies without the use of cement or brazing because the studs can be pressed into the bore in the stud body small end foremost and will wedge therein with an interference fit and will hold in the stud body throughout the life thereof.

Heretofore, however, it has not been contemplated that the pin will move in the stud body as the stud wears down and thus the tapering of the pin has been provided merely for the purpose of facilitating assembly of the pin with the stud body and eliminating the cost and labor involved in connection with a cementing or brazing operation. A tire stud embodying a tapered pin therein is illustrated and claimed in the U.S. Carlstedt Pat. No. 3,230,997, assigned to the same assignee as the instant application.

In the modification of FIG. 1, wherein the body of the stud is formed of a plastic material, the degree of taper on the stud pin is about 10° included angle between the opposite sides thereof. This degree of taper on a pin has not, heretofore, been used in respect of tire studs, to my knowledge, and represents that degree of taper which will permit the stud to wedge in the plastic body and which will support the pin in the plastic body but which will permit the pin to migrate axially inwardly into the stud body as the tire tread and stud body wear down in use.

It will be apparent that when the pin and stud are first assembled, there is a maximum length of pin engaged by the stud body. For example, the pin 14, which may be about 0.104 to 0.107 inches in diameter at the larger end, has about 0.040 to 0.060 inches thereof protruding from the outer end of the stud body and about 0.160 inches thereof located within the stud body. The total length of the pin is thus about 0.200 inches which is substantially shorter than it has been possible to make pins heretofore, for the pins to remain effective throughout the life of the tire and stud.

In the arrangement of FIG. 1, as the stud body wears down with the tread material, the amount of the pin which is gripped by the stud body is reduced and thus the force required to move the pin inwardly into the stud body is also reduced. In the case of the modification of FIG. 1, it is preferably for the pin to be so compounded as also to wear down somewhat in use, but at a rate substantially less than the rate of wear of the stud body and the tire tread material.

The tire in rolling on a roadway will bring a stud properly mounted therein into engagement with the roadway so that an impact is delivered on the outer end of the pin of the stud. As long as the stud remains substantially radial in the tire, the impact on the stud as the tire rolls on the roadway is delivered in the axial direction thereof on the outer end of the stud pin.

The exact amount of this impact is not known, but is believed to be on the order of 60 to 80 pounds and will, of course, vary with the speed of rotation of the tire and other factors.

Further, the entire stud will tend to move radially into the tire when the outer end of the stud impacts against the roadway and with the resistance to inward movement of the stud into the tire being at least partially under the control of the flared region 18 at the inner end of the central bore in the stud body.

As mentioned, the exact amount of the impact on the outer end of the pin is not known, but it is sufficient to cause inward movement of the pin into the stud body when the stud body wears down at the outer end while maintaining the protrusion of the pin from the outer end of the stud body substantially constant.

In connection with stud bodies formed of reinforced plastic, the diameter of the bore 12 is substantially constant from end to end of the stud body with the exception of a short outwardly flared portion that may be provided at the pin end of the bore for assembly purposes. Such a flared lead-in portion in the bore permits the pin to be started easily into the bore and does not in any way interfere with the movement of the pin into the body during operation of the stud according to the present invention.

In FIG. 2, the stud body 30 has a pin 32 mounted therein which is formed with a taper of about 2.5 degrees to 3 degrees, as shown. The body 30 in FIG. 2 is formed of sintered powdered metal, such as iron powder or the like and the central bore 34 in which the pin is mounted may be straight with a flared outer portion 36 at the head end of the stud.

As in connection with the stud of FIG. 1, pin 32 will migrate axially inwardly in bore 34 as the tire in which the stud is mounted rolls on a roadway and the stud body wears down thereby decreasing the gripping power of the stud body on the pin 32.

Also, as in connection with the FIG. 1 modification, the pin 32 in FIG. 2 may protrude about 0.040 to 0.060 inches from the stud body and may have about 0.160 inches thereof disposed in the stud body when the pin and body are newly assembled.

FIG. 3 shows a stud body 40 which is formed of solid metal, as on a rivet making machine, and which body has a head 42 and a central bore 44 in which a tapered pin 46 is mounted. The pin 46 in FIG. 3 has the same amount of protrusion from the stud body as those of FIGS. 1 and 2 and the same overall length but is formed with a taper of about 2°.

The metal of the stud body is somewhat more firm than the plastic material of the body of FIG. 1 or the sintered powdered metal body of the stud of FIG. 2 and a smaller angle of taper on the stud is required to permit the stud to migrate inwardly in the bore 44 of the stud body. As before, the bore 44 preferably has a flared region 48 in the head of the stud body.

FIG. 4 shows an arrangement wherein the stud body 50, and which may be a solid metal body made by a heading process, has a central bore 52 with a flared region 54 at the head end. The pin 56 mounted in the bore of the stud body has an overall length the same as the pins previously described and has the same protrusion from the stud body.

In the case of the FIG. 4 modification, the bore 52 in the stud body tapers inwardly toward the bottom at an included angle of about 15 minutes to about 30 minutes and this arrangement will permit the previously described gradual migration of the pin downwardly into the bore in the stud body as the body wears away while maintaining about the same protrusion of the pin from the body.

In FIG. 5, the stud body 60 has a straight bore 62 therethrough with a flared portion 64 at the head end of the stud and with a pin 66 mounted in the other end of the bore. Pin 66 has an included angle of about 3 degrees between the sides thereof and is of an extremely hard composition so that it wears at an extremely slow rate.

In this case, the pin may have the same protrusion of about 0.040 to 0.060 inches from the stud body but can have substantially less than 0.160 inches thereof within the stud body because of the slow wear rate of the pin. It is not necessary for the pin to wear away for it to grip snow and ice and in the case of FIG. 5, a short pin which wears extremely slowly can be employed if the pin is permitted to migrate axially inwardly into the stud body as the stud and tire wear away.

FIGS. 6 and 7 show a modification for obtaining controlled inward migration of the pin into the stud body. In these figures, stud body 70 has a head 72 at one end and a central bore 74 terminating in a flared out portion 76 at the head end. A tapered hard wear resistant pin 78 is mounted in the end of bore 74 opposite the head end and may taper at an included angle of about 3° from top to bottom.

The particular feature of the stud of FIGS. 6 and 7 is illustrated in FIG. 7 wherein it will be seen that bore 74 is provided with axial grooves, or pockets, 80 circumferentially distributed therein and decreasing in circumferential width toward the head end of bore 74. With this arrangement, the pin 78 is supported on land areas 82 between the pockets and these land areas gradually widen toward the head end of the stud.

By widening the land areas toward the head end of the stud, as the stud wears off in use so that the amount of the pin in the stud bore becomes shorter whereby less resistance would normally be offered to the pin being driven axially inwardly into the bore, the resistance to such inward movement can be maintained about constant thereby permitting the pin of the stud to maintain substantially the original protrusion of about 0.040 inches from the outer end of the stud body.

FIGS. 8 and 9 show another modification in which the tapered pin 90 is mounted in a bore 92 formed in the body 94 of the stud body. Bore 92 is provided with circumferentially distributed flats 96 extending longitudinally in the bore and inclined so as to converge toward the head end of the stud body. In this manner also the resistance to inward movement of the pin into the stud body remains about constant as the pin wears off and moves into the body and there is less length of the pin gripped by the body.

Other arrangements for controlling the resistance of the pin to movement inwardly into the stud body will occur to those skilled in the art.

FIG. 10 more or less schematically illustrates the appearance of a stud according to the present invention at various stages in the life thereof. The view at the left side of FIG. 10 shows the stud newly assembled and progressive stages in the wear thereof are shown toward the right. For identification, the various stages are identified by capital letters A through E with A representing the new stud and E representing the stud when it is substantially completely worn away.

At stage E, when the stud and tire are about used up, the stud is moved inwardly a distance of about 0.235 inches.

It will be appreciated that the inward movement of the pin into the stud body permits the pin to be made substantially shorter than has heretofore been possible and likewise permits the use of harder material in the pin than has heretofore been possible.

Furthermore, the rate of wear of pin need no longer be matched to the rate of wear of the tire tread but will automatically adjust in the stud body to have the proper amount of protrusion. The studs with inwardly migrating pins according to the present invention do not protrude excessively from the tire tread and thus do not tilt in the tire and thereby slip excessively on the road surface, and thereby do not wear the road surfaces as rapidly as conventional studs while, simultaneously, less heat is developed in the stud body thus preventing the studs from becoming loose in the tire tread due to deterioration of the tread material.

Still further, the studs remain upright in the tire and are always presented endwise to the road surface and thus operate efficiently throughout the life of the tire and tread and are substantially more quiet in operation than studs with excessive protrusion from the tire tread.

Reference to FIGS. 11 to 15 will serve further to clarify the nature of the present invention. FIG. 11 is a graph in which the protrusion of the pin of the stud beyond the tire tread is plotted against the impact delivered to the pin as the tire rolls on a roadway. Inasmuch as the stud body wears off so as to be substantially flush with the tread, it will be understood that the protrusion of the pin from the surface of the tire tread is substantially equal to the protrusion of the pin from the outer end of the stud body.

In FIG. 11, the desired protrusion of the pin is indicated by the dotted line at 100 and the effective impact on the pin at the desired protrusion is indicated by the line 102.

As will be seen in FIG. 12, when the tire 104 rolls on a road surface 106, a stud 108 in the tire which is approaching the road surface, will be presented to the road surface substantially endwise as indicated by arrow 110 which is an arc struck from about the instantaneous center of rotation of the wheel located at 112. From FIG. 12 it will be appreciated that the impacts referred to are delivered substantially axially of the pin in the stud body.

FIG. 13 is a graph showing the conditions that must be established in a stud when both the pin and the body wear down in use. It is readily perceivable that as the body wears down, there is less length of pin in the body and, therefore, less force is required to drive the pin axially into the body.

However, where both the pin and the body wear down, the length of pin in the body necessarily decreases in order to maintain the same amount of protrusion of the pin from the body and this requires that the resistance offered by the body to axial movement of the pin per unit length of the pin in the body increase. The ideal conditions are shown in FIG. 13 in which the length of pin in the body as is plotted against the resistive force offered by the body per unit length of pin therein to movement of the pin in the body.

Thus, with the stud body configured and constructed to offer greater and greater resistance per unit length of the pin therein to inward movement of the pin in the body, both the body and the pin can wear off in use and about the same amount of protrusion of the pin from the body will be maintained throughout the life of the stud.

FIG. 14 graphically shows the conditions that obtain when the pin is formulated of a material that imparts such hardness to the pin that it wears very little during the life of the stud. Under these circumstances, about the same length of pin will always be located in the stud body for the desired protrusion.

In this case, the bore of the body is so selected and configured that substantially the same resistive force is developed thereby throughout the life of the stud against inward movement of the stud. The resistive force is, of course, the force per unit length of the pin in the stud body so that when the body wears off and the stud pin then has a greater protrusion and a shorter length in the body, the increased impacts on the pin will drive it axially into the body and restore the original conditions.

In FIG. 14, the desired protrusion of the pin from the stud body is indicated by the range between lines 114 and the force required to move the pin axially into the body between those limits of protrusion force lies between the lines 116.

When the protrusion goes beyond the upper limit of the range 114, the pin will move axially into the body to bring the protrusion back to within the range 114 and, should the pin protrusion be less than the range indicated by lines 114, no pin movement will occur till the body wears down to the point that the proper amount of protrusion of the pin is restored.

FIG. 15 shows a typical stud according to the present invention with the pin merely dropped into the upper end of the bore in the stud body but not yet pressed into position. In FIG. 15, the stud body is indicated at 200 and the pin at 202. It will be observed that the pin is quite short relative to the limit of the body and this is possible according to the present invention because the stud migrates axially inwardly into the bore 204 in the stud body as the stud body wears down.

In the arrangement shown in FIG. 15, the diameter of the larger end of the pin, indicated at D1, might range from 0.104 to 0.107 while the diameter of the smaller end, indicated at D2, might range from 0.084 to 0.087. The included angle between the sides of the stud is indicated as 3°, but can range down to 2.5°.

The length of the stud body, indicated by dimension L, can be about 0.400 to about 0.580 and the diameter of the head, indicated by dimension H may be about 0.300 to about 0.350.

The bore 204 in the stud body tapers inwardly toward the bottom at an included angle between the sides thereof of about 1° 16 minutes. At its extreme upper end, the diameter of the bore, indicated at D3, is about 0.100 and at the bottom, indicated at D4, is about 0.088. The diameter of the shank portion of the stud body, indicated at D5, ranges from about 0.198 to 0.202.

The specific stud illustrated in FIG. 15 is merely exemplary of a number of different forms which a stud body according to the present invention can take in order to provide for the inward movement of the pin into the stud body that has been described.

In FIG. 15, the bore in the stud body tapers uniformly inwardly from end to end but, with other materials, it might be desirable to taper the pin end of the bore at a greater angle than the remainder of the bore, or even to make the remainder of the bore straight with no taper therein.

In FIG. 16, the bore 300 extending axially through the stud body 302 is provided with an upwardly facing shoulder 304 near the body. This shoulder is provided to prevent the pin from being pushed completely through the stud body when the stud body is worn down and is near the end of its life because the pin pushing completely through the stud body could cause damage to the tire in which the stud is mounted.

Further, as has been described above, the bore may be configured other than circular in order to obtain the desired resistance to inward movement of the pin into the body and the change thereof per unit length of the pin in the body as has been described hereinbefore.

What is claimed is:

1. The method of making a tire stud having a body with a head on one end and a pin substantially more wear resistant than the body mounted in the body on the axis thereof and having one end protruding a predetermined distance from the body at the end thereof opposite said head, said tire stud being adapted for mounting head end foremost in a blind radial hole in a tire tread with the pin end of the body about flush with the tread surface whereby the protruding end of the pin and the pin end of the body will wear as the tire rolls on a roadway while the amount of protrusion of the pin from the body remains about constant, said method comprising; forming the body with an axial pin receiving bore extending substantially completely therethrough and at least about twice the length of said pin, forming said pin to a uniform taper, forming at least one of said pin and said bore such that said pin has an interference fit in said bore when inserted small end foremost therein and axially inward movement of said pin in said bore until only a minor portion of the length of the pin protrudes from the body is resisted with a resistive force which increases as the pin moves axially into the bore in the body and when the said minor portion only of the pin protrudes from the bore reaches an amount which is about equal to the axial force exerted on the pin by a road surface when a tire having the stud mounted therein rolls on the road surface, and pressing the pin small end foremost into said bore with a force about equal to the said axial force which will be exerted on the pin by the roadway and until said minor portion only of the length of the pin protrudes from the body.

2. The method according to claim 1 in which said forming of at least said one of said pin and said bore is such as to provide increased resistance to movement of said pin axially inwardly in said bore as said body wears off at the outer end and the pin migrates axially into said body due to the force exerted thereon by the roadway.

3. The method according to claim 2 in which the said forming of at least one of said pin and bore is such that the product of the length of the pin in the bore and the resistive force of the bore on the pin per unit length of the pin in the bore remains substantially constant as the body wears down in use.

4. The method according to claim 1 in which said pin is formed of a cemented metal carbide composition of such hardness that the rate of wear of the pin during the life of the stud is minimal.

5. The method according to claim 1 in which said pin is formed of a cemented metal carbide composition of such hardness that the rate of wear of the pin during the life of the stud is substantial by less than the rate of wear of the stud body and the tread material of the tire in which the stud is mounted.

6. The method according to claim 1 in which said pin is formed of a cemented metal carbide of such hardness that the rate of wear of the pin is not more than a small fractional part of the rate of wear of the stud body and the tread material of the tire in which the stud is mounted.

7. The method according to claim 1 in which said pin is formed of a cemented metal carbide of such hardness that the rate of wear of the pin is less than but a substantial fractional part of the rate of wear of the stud body and the tread material of the tire in which the stud is mounted.

8. The method according to claim 1 in which said forming of at least one of said pin and bore takes the form of imparting such cross sectional configurations thereto that a portion only of the surface area of the portion of the pin disposed in said bore engages the bore wall.

9. The method according to claim 8 in which said pin is formed to be circular in cross section while said bore is formed to be noncircular in cross section.

* * * * *